United States Patent [19]
Grewe et al.

[11] Patent Number: 5,625,673
[45] Date of Patent: Apr. 29, 1997

US005625673A

[54] MODULAR COMMUNICATION APPARATUS

[75] Inventors: Anthony J. Grewe, Holmdel; Michael Kerwin, West Orange; Carl S. Ledbetter, Jr., Summit; B. Waring Partridge, III, Far Hills, all of N.J.

[73] Assignee: Lucent Technologies Inc., Murray Hill, N.J.

[21] Appl. No.: 310,297

[22] Filed: Sep. 22, 1994

[51] Int. Cl.⁶ .............................. H04Q 7/32; H04M 1/00
[52] U.S. Cl. .............................. 379/61; 379/428; 379/58; 455/90
[58] Field of Search .............................. 379/58, 59, 57, 379/428, 420; 340/825.44; 455/89, 90

[56] References Cited

U.S. PATENT DOCUMENTS

| | | | |
|---|---|---|---|
| 4,748,574 | 5/1988 | Tuchto | 379/428 |
| 4,991,197 | 2/1991 | Morris | 379/58 |
| 5,020,090 | 5/1991 | Morris | 379/58 |
| 5,127,041 | 6/1992 | O'Sullivan | 379/59 |
| 5,127,050 | 6/1992 | Takahashi et al. | 379/428 |

OTHER PUBLICATIONS

"Gizmo—A Chronicle of Consumer Electronics", *Popular Electronics;* pp. 51–62, 92–93, Mar. 1994.

*Primary Examiner*—Dwayne D. Bost
*Assistant Examiner*—Michael B. Chernoff

[57] ABSTRACT

A versatile device is obtained with a PDA that includes means for cordless connecting to specialized accessories. The PDA can operate in its conventional mode, or it can be enhanced by interconnecting it with some or all of its accessories. In one embodiment, the PDA is combined with a cellular telephone that is adapted to physically mate with the PDA and form thereby a single integrated apparatus. In another embodiment, the PDA is combined with a landline telephone that is adapted to mate with the PDA and form thereby another single integrated apparatus. In a still another embodiment, the PDA (whether or not mated with a telecommunication device) is combined with a keyboard to form a laptop computer.

23 Claims, 5 Drawing Sheets

MODULAR COMMUNICATION APPARATUS

1. Field of the Invention

This invention generally relates to communication apparatus and, more particularly, to apparatus that at times performs telecommunication functions and at times performs processing functions.

2. Description of the Prior Art

The market offers a number of portable processing devices that assist people with their processing and information needs. In size order, for example, that includes calculators, organizers, personal digital assistants (PDAs), and notebook/laptop computers.

Calculators are, of course, limited to mathematical operations. Some of the more expensive ones can store calculation programs, but most do not.

Organizers are able to receive information, store it, process it, and display it. Typically, they are used for keeping track of appointments and the like. Organizers differ from calculators in that they handle text. Physically, they are small enough to fit in a man's suit pocket or a woman's purse. While in some sense these organizers can be thought of as computers, they nevertheless hold a separate niche in the market because of their small size and the collection of specialized software packages that they come with, including a specialized operating system. An operating system is a set of fixed programs that control the general operation of the organizer, including the manner of interaction with the user.

PDAs, which are much more versatile computers, are characterized by a relatively large touch sensitive screen which serves as both the input and output interface with the user. These PDAs boast a unique operating system that accomplishes most tasks by guiding the user through a sequence of selections. Typically, the operating system also includes an application for character recognition of script writing, and that allows the user to enter information that is not included in an anticipated set of possible inputs.

Lastly, there is the notebook/laptop computer that typically includes a keyboard, a screen, a memory, and a generalized operating system that allows the user to apply information directly, as well as execute application programs that guide the user through a sequence of selections.

In the realm of telecommunication, there is another portable device that is sweeping the market and that is the cellular telephone. Not unexpectedly, the art has attempted to combine computing and telecommunication, and there are devices now on the market that are basically a combination of the laptop computer and the cellular telephone.

What is needed, however, is more flexible devices that can operate as PDAs when that is desired, as laptop computers when that is desired, and as computers that interact with cellular or landline telecommunication apparatus when that is desired.

SUMMARY OF THE INVENTION

A versatile device is obtained, in accordance with the principles of this invention, with a PDA that includes means for connecting to specialized accessories. The PDA can operate in its conventional mode, or it can be enhanced by interconnecting it with some or all of its accessories. In one embodiment, the PDA is combined with a cellular telephone that is adapted to physically mate with the PDA and form thereby a single integrated apparatus. In another embodiment, the PDA is combined with a landline telephone that is adapted to mate with the PDA and form thereby another single integrated apparatus. In a still another embodiment, the PDA (whether or not mated with a telecommunication device) is combined with a keyboard to form a laptop computer.

DETAILED DESCRIPTION

Figure 1:
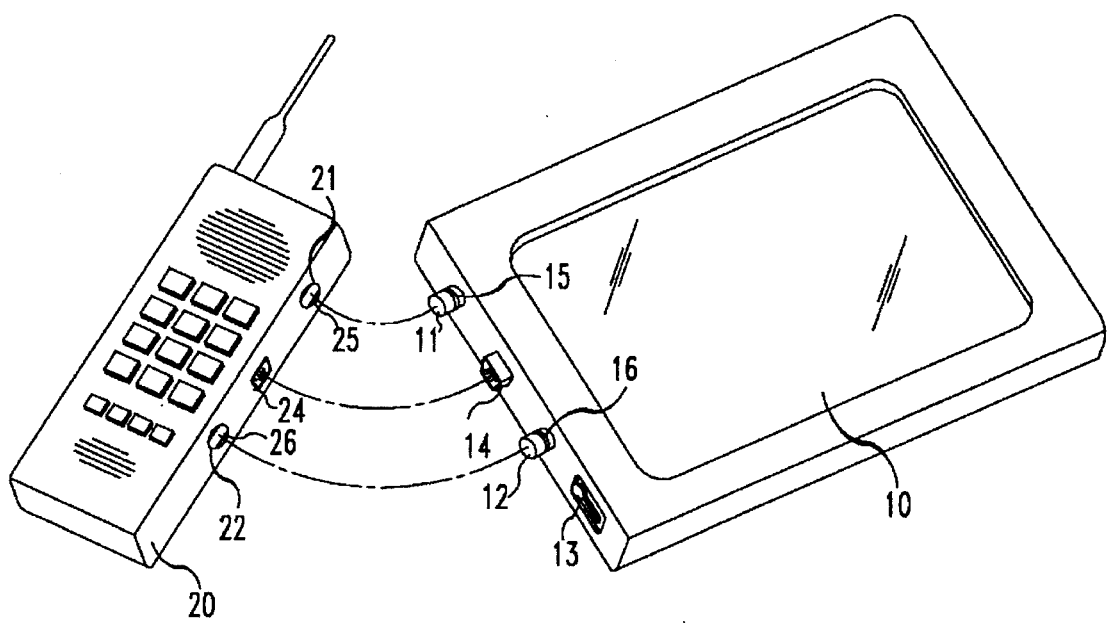
FIG. 1 depicts a PDA and a wireless telephone that are adapted for physical and electrical connection to each other.

FIG. 1 depicts a PDA 10 in a top-left handed view and a cellular telephone 20 in a top-right handed view. Portions of a connector arrangement are shown on the left side of the PDA. They include coupling elements 11 and 12, activator element 13 and connector 14. The right side of the cellular telephone includes corresponding elements of an arrangement that includes coupling elements 21 and 22, and connector 24. More specifically, elements 11 and 12 are posts with grooves 15 and 16 respectively, and the posts protrude out of the left side surface of the PDA. Connector 14 is a multi-pin male connector that also protrudes from the left side surface of the PDA. Coupling elements 21 and 22 are cavities that are positioned in cellular telephone 20 to concurrently mate with posts 11 and 12, respectively, and sized for a reasonably tight fit of posts 11 and 12 within cavities 21 and 22. Cavities 21 and 22 include spring elements 25 and 26 that are arranged to engage with grooves 15 and 16 when posts 11 and 12 are fully inserted into cavities 21 and 22. Connector 24 is a female connector that is adapted to mate with connector 14 when posts 11 and 12 are inserted into cavities 21 and 22.

Figure 2:
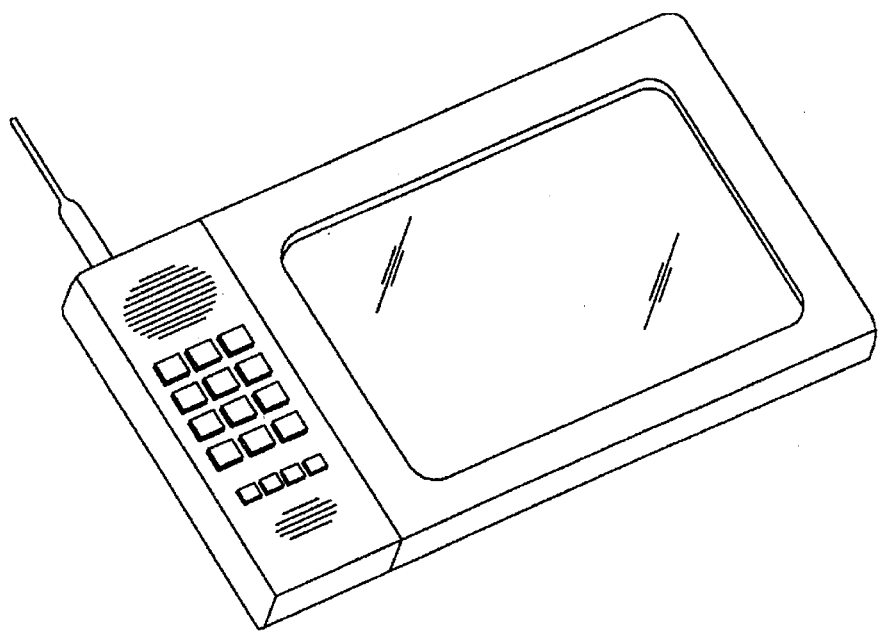
FIG. 2 presents the PDA and the wireless telephone of FIG. 1 mated to form an integral apparatus.

To couple cellular telephone 20 to PDA 10, posts 11 and 12 and connector 14 are aligned with cavities 21 and 22 and connector 24, respectively, and snapped, or forced, together. The result is a physically connected assembly that appears as a unitary PDA with an integral cellular telephone (or vice-versa). This is depicted in FIG. 2. The connection strength imparted by the posts and the connector allows the assembly of FIG. 2 to be handled as a single device.

Electrically in the cellular telephone, connector 24 is the very same connector that is currently available in many cellular telephones. The only difference, if any, is in the physical placement of the connector in the side of the telephone.

When cellular telephone 20 is an analog telephone, then connector 14 is coupled to a modem within PDA 10. When cellular telephone 20 is a digital telephone, then a modem is not required. The exact electrical interface between PDA 10 and telephone 20 is not a part of this invention, so it is not described here in detail. Suffice it to say that the interface must satisfy the requirements of both the telephone and the PDA. U.S. Pat. No. 5,127,041 issued Jun. 30, 1992 illustrates one approach.

Figure 3:
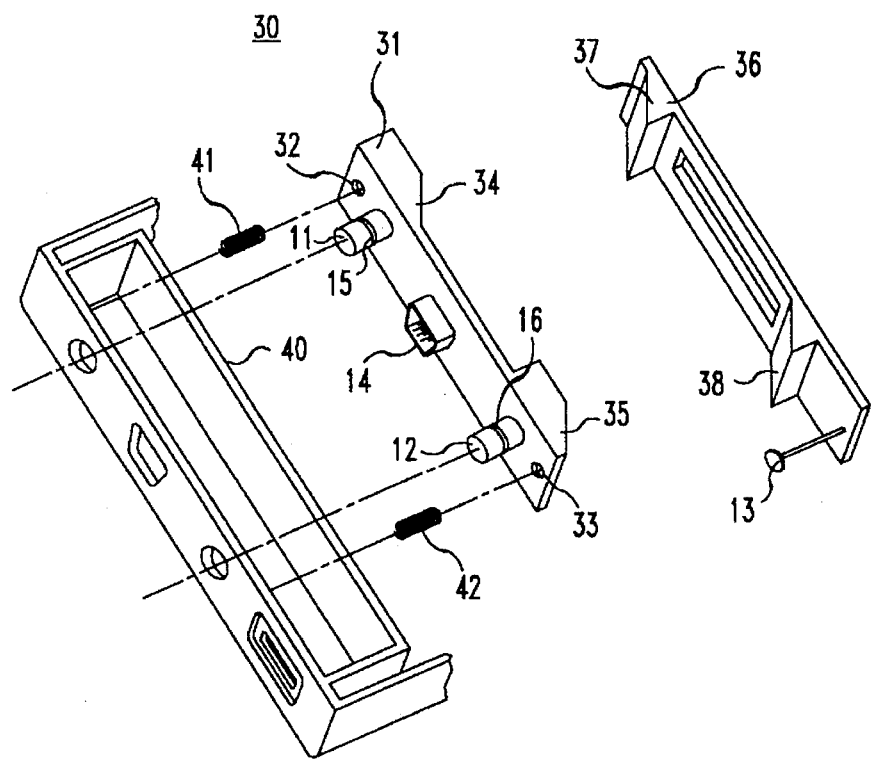
FIG. 3 shows, in exploded view, the means for physical and electrical coupling of the PDA to the wireless telephone.
Figure 4:
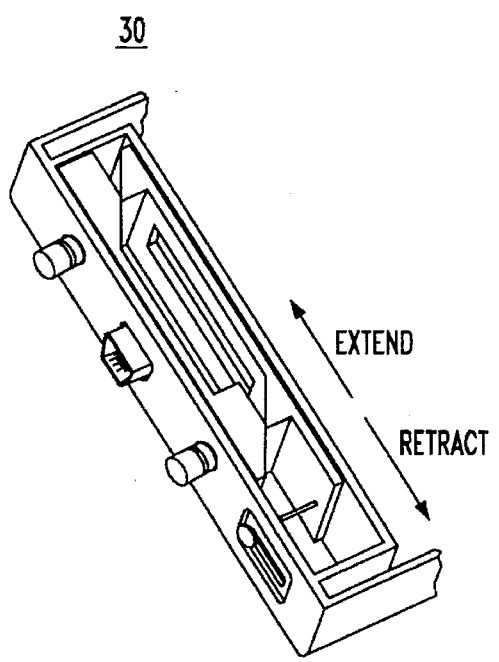
FIG. 4 shows the elements of FIG. 3 in assembled form.

FIG. 3 presents an exploded view of connector 30, and FIG. 4 shows connector 30 in its assembled mode. The connector of FIG. 3 is merely illustrative, of course. Other connector arrangements are also possible and are within the scope and contemplation of this invention.

The connector of FIGS. 3 and 4 comprises the two primary components 31 and 36, springs 41 and 42, and housing 40. Member 31 is characterized by posts 11 and 12 extending from one surface thereof and connector 14 attached to the same surface. That same surface also includes two blind bores 32 and 33 with a diameter that is large enough (in diameter) to allow springs 41 and 42 to be inserted into the bores, and shallow enough to merely maintain the springs in position. Opposite the surface on which posts 11 and 12 are found there are ramp surfaces 34 and 35.

Member 36 is characterized by corresponding ramp surfaces 37 and 38, and an activator element 13, which advantageously, is a capped post that is screwed into the body of member 36.

Housing 40 is a molded part of the housing of PDA 10 and it includes appropriate openings in its outside wall to allow posts 11 and 12, connector 14 and the post portion of activator element 13 to extend through the openings.

The general principle of the FIGS. 3 and 4 connector is that member 31 is situated in housing 40 either in a retracted position or in an extended position (in FIG. 4 it is depicted in the extended position). In the retracted position, posts 11 and 12 and connector 14 *do not* extend outside housing 40 (i.e., are flush with the outside wall of housing 40), and member 31 is kept in this position by the force of springs 41 and 42 acting to separate member 31 from the outside wall of housing 40. In the extended position, ramp surfaces 37 and 38 are engaged with ramp surfaces 34 and 35, respectively, to push member 31 toward the outer wall of housing 40, against the force of springs 41 and 42. In this extended position, posts 11 and 12 and connector 14 extend through the outer wall of housing 14. Such extending allows the connection of cellular telephone 20 to the housing of PDA 10, as described above. Member 36 is caused to engage its ramps 36 and 37 with ramps 34 and 35 by applying a force to the cap of activator element 13 to slide member 36 in the direction of the arrow marked "extend" in FIG. 4. Correspondingly, ramps 36 and 37 are disengaged from ramps 34 and 35 by sliding element 36 in the direction marked "retract".

Figure 5:
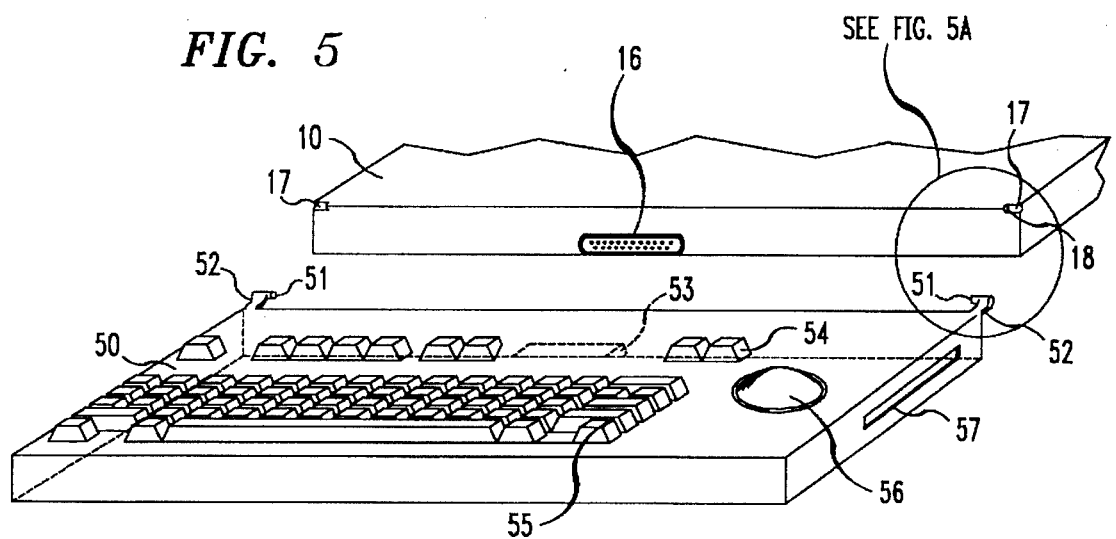
FIG. 5 presents a keyboard adapted for connection to a PDA to form a laptop computer.
Figure 5A:
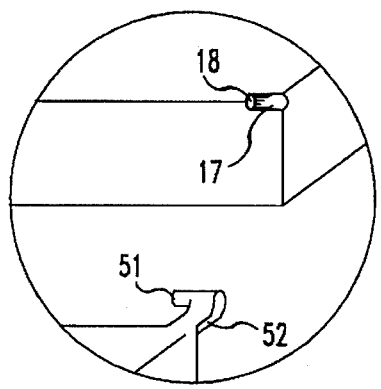
FIG. 5A presents the details of the physical interconnection between the PDA and the keyboard.

In addition to converting the PDA of FIG. 1 to a communicating processor unit by coupling to it the cellular telephone, it is desirable to enhance the PDA by allowing it to support a keyboard. That is, while it is expected that many applications will be well served through the touch screen interface of the PDA, it is also anticipated that some applications would be better served when a "full fledged" keyboard is included. To that end, FIG. 5 shows a PDA that includes two somewhat cylindrical recesses 17 at two corners of the PDA and a connector 16. The cylindrical recesses end with holes 18.

FIG. 5 also illustrates a keyboard that is adapted for connection to holes 18 and to connector 16. More specifically, FIG. 5 presents a keyboard 50 that includes, at each of two end corners, a connection assembly for connecting to cylindrical recesses 17 and holes 18. Each assembly includes a slightly flexible protrusion 52 with a cylindrical end portion 51 that is at 90 degrees with respect to protrusion 52. End portion 51 fits into hole 18 and pivots within it to allow keyboard 50 to swing into an open position or a closed position. In the closed position the keyboard covers the display of the PDA. In the open position, a connector 53 swings into and mates with connector 16, thereby making an electrical connection between keyboard 50 and PDA 10.

Keyboard 50 includes conventional keys such as key 55, function keys such as key 54, a track ball 56, and a floppy disk drive (not shown) coupled to port 57. It could also include a hard disk (also not shown). Port 57 could alternatively comprise a PCMCIA connector to which various other devices can be connected, etc.

While it is novel to have these computer accessories in the keyboard housing, particularly in the arrangement disclosed herein where those accessories are not likely to be used unless a "laptop" computer configuration is desired, the electrical connection between those accessories and the processor within PAD 10 is completely conventional. The same connections that are normally made to these accessories are made via connectors 16 and 53 in the FIG. 5 arrangement.

While it will be very useful to allow users to travel with PDA 10 and to even allow such users to communicate data to and from PDA 10 via cellular telephone 20, it is also realized that PDA 10 can be used in the office, where cellular telephony need not be used. Moreover, in an office environment it would be useful to operate the PDA from an external power source to save on battery power. To that end, PDA 10 is provided with a connector strip 80 on a face of PDA 10 that, illustratively, is opposite the face where the keyboard is coupled. Strip 80, shown in FIG. 6, includes enough contacts to provide both power and data connectivity to a landline telephone. Looking at FIG. 6, note might be taken of handle 83 which is included for carrying convenience.

Figure 6:
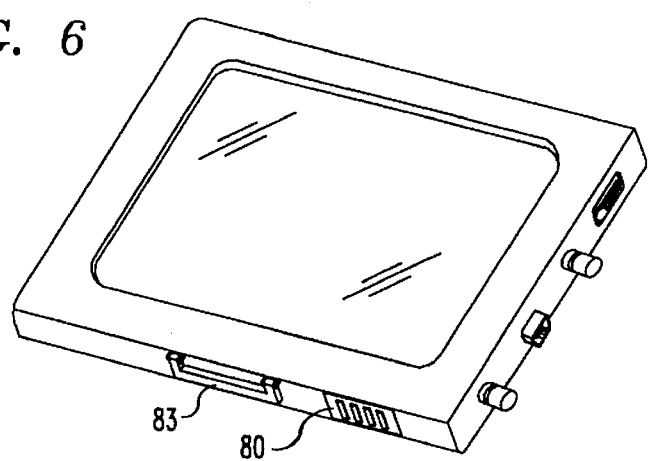
FIG. 6 illustrates the electrical port of a PDA that allows it to interconnect with a landline telephone.
Figure 7:
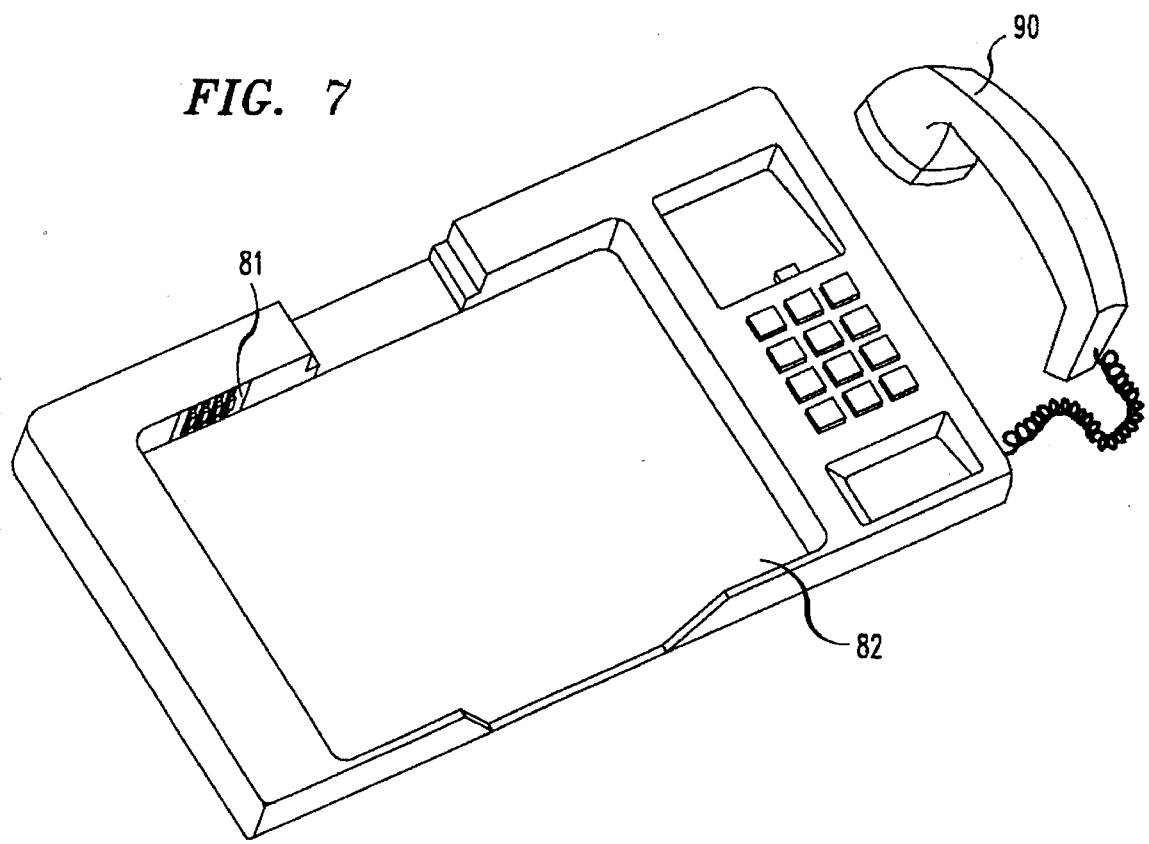
FIG. 7 illustrates a landline telephone adapted for interconnection with the PDA of FIG. 6

FIG. 7 illustrates a novel design for a landline telephone 90 with a housing that is adapted to receive, and operate with, a PDA such as the one illustrated in FIG. 6. In particular, the FIG. 7 telephone includes a tray, or receptacle, 82 that is fashioned to hold PDA 10, whether connected to keyboard 50 or not. Tray 82 includes a connector strip 81 that is positioned in the tray to mate with contacts in strip 80 when PDA 10 is in the tray.

Figure 8:
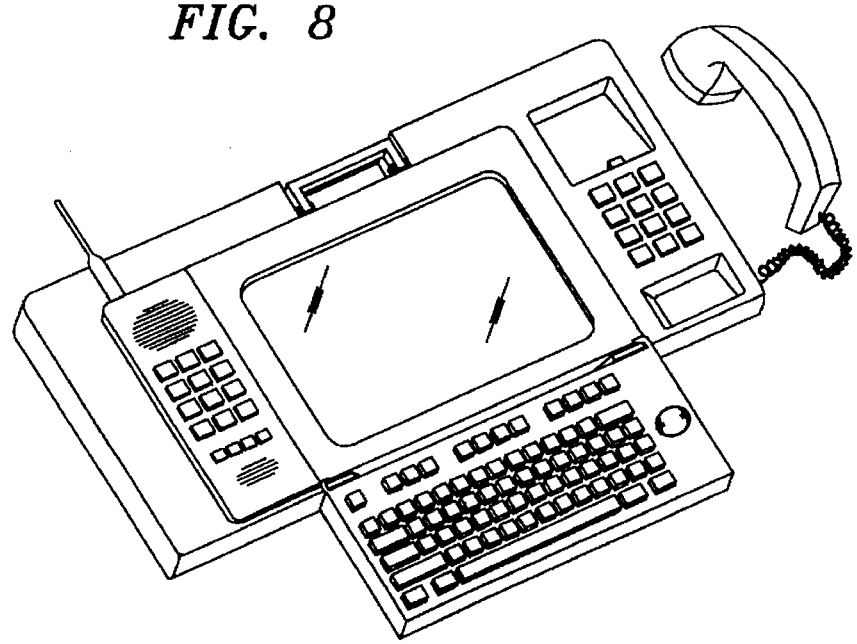
FIG. 8 presents an arrangement where a PDA is connected to a landline telephone and concurrently to a wireless telephone and a keyboard.

Lastly, FIG. 8 illustrates a landline telephone with a housing which includes a tray that is large enough to hold PDA 10 when it is coupled to cellular telephone 20.

It would be obviously advantageous for PDA 10 to automatically recognize when it is connected to the various accessories disclosed above and modify its operating style accordingly. This capability is easily achieved by detecting signal conditions at connectors 14, 16 and 80. A number of such capabilities are presented below for illustrative purposes, and others are easily visualized.

Figure 9:
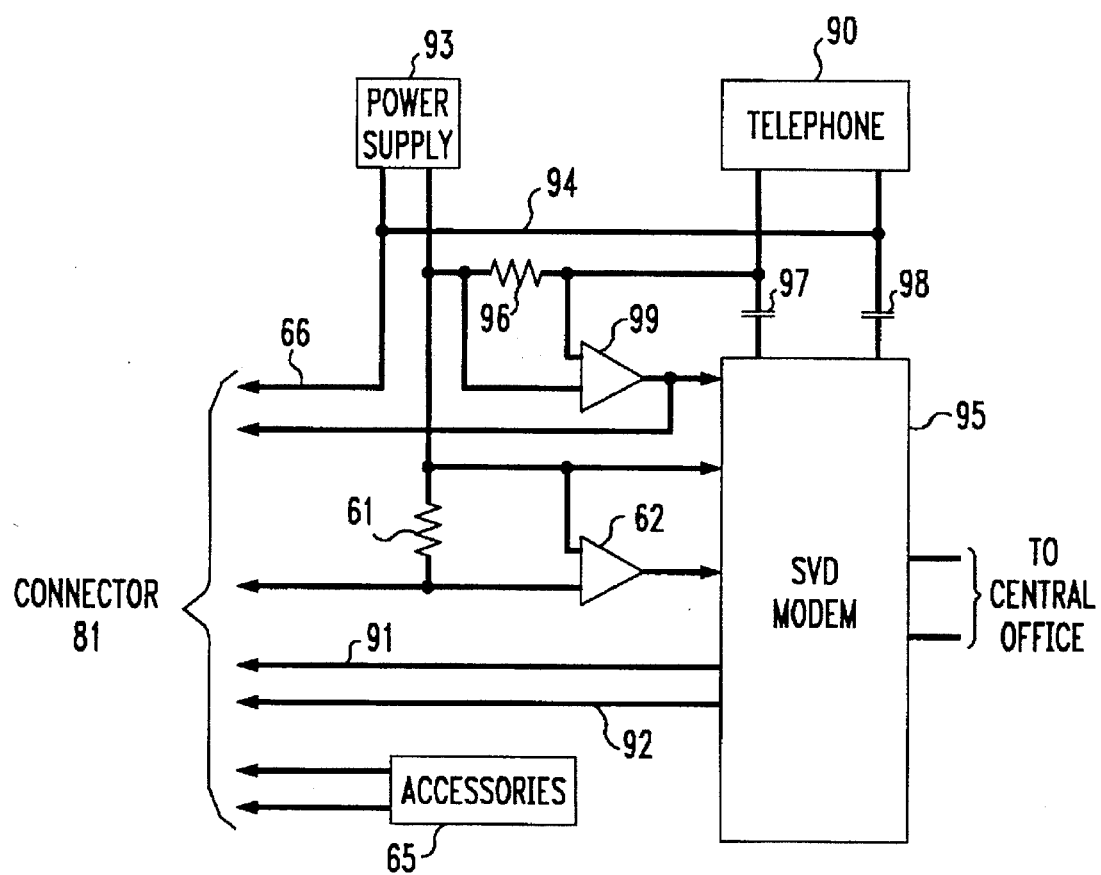
FIG. 9 is a schematic diagram of a simultaneous voice and data modem and its associated circuitry.

FIG. 9 is a schematic diagram of circuitry between connector 81 and the terminals adapted for connection to the central office. In FIG. 9, the landline telephone is connected to the central office POTS line through a simultaneous voice and data (SVD) modem 95, such as the one disclosed in copending application Ser. No. 08/076,505, filed Jun. 14, 1993, and titled "Simultaneous Analog and Digital Communication". A digital signal port represented by lines 91 and 92 is also connected to the central office through SVD modem 95.

To describe this modem in a nutshell, it modulates applied digital signals and analog signals onto a carrier. More specifically, it forms symbols from groups of bits, maps the symbols onto two signals, samples the analog signal and also maps the analog samples onto the two signals. It then modulates the mapped signals with two orthogonal carriers, sums the result and outputs the sum. All this is done under command of a modem controller within modem 95 that is also sensitive to signal conditions on the telephone line side, on the digital port, and on the analog port.

In particular, the controller detects dial tone and ringing (as all modem controllers do), it detects the presence of digital signals on the digital port (also as all modems do), and it detects an "off hook" condition on the analog port. The latter is accomplished by including a voltage source and current detection means in the controller, to emulate a central office. In the FIG. 9 embodiment, sensing of an "off hook" condition in telephone 90 can be done outside the controller because a power supply 93 is provided for the digital port. Thus, dc power is supplied to telephone 90 through lead 94 and resistor 96, and that dc power is isolated from the modem by capacitors 97 and 98. The "off hook" condition is detected by amplifier 99 having two inputs that straddle resistor 96. The output of amplifier 99 is applied to the controller within modem 95.

Power supply 93 also supplies power to the modem and to connector strip 81. The path to strip 81 also includes a current sensor, comprising series resistor 61 that straddles the two inputs of differential amplifier 62 that applies a control signal to modem 95. A current through resistor 61 that exceeds a predesigned threshold switches amplifier 62 from "off" to "on", indicating that PDA 10 is resting in its tray. It does not mean, of course, that data is flowing through leads 91 and 92, but it does suggest to modem 95 that it should become sensitive to the presence of data.

FIG. 9 also includes accessories 65 which are powered by supply 93 and which interact with PDA 10 via connector strip 81. Accessories 65 can be one or more of the devices that are commonly connected to a computer bus, such as a mouse, a floppy disk, a hard disk, a PCMCIA connector port, semiconductor memory, CD ROMS, etc. The connection of these elements to the processor within PDA 10 is completely conventional.

The above description illustrates actions taken by the apparatus associated with telephone 90, i.e. by the apparatus between strip 81 and the port connecting to the central office. On the PDA side, the interactions are with strip 80, with connector 16 and with connector 14. The most basic interactions that PDA 10 may wish to include is the ability to automatically realize that cellular telephone 20 is connected, that keyboard 50 is connected, and that landline telephone 90 is coupled. Additionally, it may be useful to know whether any of the connected telephones go "off hook". With each of these pieces of knowledge, the operating system of PDA 10 adjusts itself to a different mode of operation, and may even trigger application software.

For example, when the PDA rests in the tray of telephone 90 and a power supply voltage is supplied to PDA 10 from power supply 93 through strip connectors 81 and 80, it is advantageous for this power source to power the PDA itself, to power the accessories in keyboard 50, and to power, and/or charge the internal battery of cellular telephone 20. This is easily achieved by connecting the power leads in strip 80 to power leads in connectors 14 and 16.

To automatically determine that cellular telephone 20, keyboard 50 and/or telephone 90 are connected to PDA 10, all that is necessary is to detect the presence of a known signal, or voltage level at the respective terminals. Clearly, looking at the power leads coming from connector strip 80 is a simple solution, and a similar solution can be had in with the other connectors. If there is no inherent dc voltage that can be derived from connectors 24 and 53 (when they are coupled to connectors 14 and 16, respectively), one can be created by applying the battery voltage of PDA 10 to one pin of connector 24, for example, shorting that pin to another pin, and observing the voltage at a corresponding pin in connector 14.

Lastly, to recognize an "off hook" state of telephone 90, lead 66 (in FIG. 9) couples the output of amplifier 99 to strip 80 and to PDA 10, and the voltage on that lead provides the necessary information.

The entire operating system of PDA 10 can be altered when any of the above-considered elements are connected to PDA 10. It is expected, however, that the biggest change in the operating system will take place when a keyboard is connected to the PDA, converting the PDA to laptop computer.

We claim:

1. Apparatus including a personal digital assistant (PDA) that contains a housing, a processor in said housing and an input/output device arrangement in said housing coupled to said processor for inputting data to, and outputting from, said processor, the improvement comprising:

a first connector on a first side of the perimeter of said housing, coupled to said processor, for cordless physical coupling to a mating connector of an external telephone to enable a communication connection to be established between the PDA and said telephone; and first means, located on said first side of the perimeter of said housing and integral to said housing, for physically mounting said housing to said telephone so as to support said telephone by said housing and to effectively form a single, substantially rectangular, substantially flat, physical unit that comprises said housing and said telephone to maintain said first connector connection to said telephone connector.

2. The apparatus of claim 1 wherein said telephone is a wireless telephone.

3. The apparatus of claim 2 further comprising a wireless telephone that includes a housing with a second connector constructed to mate with said first connector and a second means for physically connecting the housing of the wireless telephone to the housing of the PDA, said wireless telephone having its second connector engaged with said first connector and its second means for physically connecting engaged with said first means of the housing of the PDA.

4. The apparatus of claim 2 wherein said means for physically connecting comprises at least one spring-action fastener in said housing.

5. The apparatus of claim 1 wherein said telephone is a landline telephone.

6. The apparatus of claim 1 further comprising a landline telephone with a housing that includes tray means for accepting the PDA of claim 1.

7. The apparatus of claim 6 where said tray means includes a connector that is constructed to mate said landline telephone to the PDA when said PDA is placed in said tray means.

8. The apparatus of claim 7 wherein said connector included in the tray is coupled to said first connector through direct pressure contact.

9. The apparatus of claim 7 wherein said connector in the tray means includes contacts for providing dc power to the PDA.

10. The apparatus of claim 6 wherein said telephone includes a modem.

11. The apparatus of claim 10 wherein the modem is a simultaneous voice and data modem.

12. The apparatus of claim 7 wherein the landline telephone includes memory that is coupled to the connector which is constructed to mate said landline telephone to a PDA.

13. The apparatus of claim 1 further comprising a second connector in said housing, where the first connector is constructed for physical connection to a wireless telephone and the second connector is constructed for a cordless physical connection to a connector in a housing of an external landline telephone.

14. The apparatus of claim 13 further comprising a landline telephone with a housing that includes tray for accepting the apparatus of claim 13 and a third connector, where said second connector is coupled to said third connector.

15. The apparatus of claim 14 wherein said second connector and said third connector are arranged to mate and make electrical contact by the mere placement of said apparatus of claim 14 in said tray.

16. The apparatus of claim 13 further comprising a wireless telephone that includes a housing with a connector constructed to mate with said first connector and a means for physically connecting the housing of the wireless telephone to the housing of the PDA, said wireless telephone having its connector engaged with said first connector and its means for physically connecting engaged with said first means for physically connecting present in the PDA, thereby forming a unitary, integral, apparatus.

17. The apparatus of claim 16 further comprising a landline telephone with a housing that includes a tray for accepting the apparatus of claim 16 and a third connector, where said second connector is coupled to said third connector.

18. The apparatus of claim 1 further comprising a second connector in said housing for coupling said processor to a mating connector in an external keyboard interface, and second means, integral to said housing, for physically connecting said housing to said keyboard interface to effectively form a new single physical unit that comprises said housing, said telephone, and said keyboard interface.

19. The apparatus of claim 18 wherein said PDA includes a touch sensitive screen, and said second means includes a swivel mechanism to allow said keyboard interface means to cover said touch sensitive screen.

20. The apparatus of claim 18 further comprising a keyboard interface unit coupled to said second connector.

21. The apparatus of claim 20 wherein said keyboard interface unit includes a PCMCIA connector electronically coupled to said second connector.

22. The apparatus of claim 20 wherein said keyboard interface unit includes memory coupled to said second connector.

23. The apparatus of claim 22 wherein said memory is a hard disk memory.

\* \* \* \* \*